(12) United States Patent
Holley et al.

(10) Patent No.: US 8,931,513 B1
(45) Date of Patent: Jan. 13, 2015

(54) WATER SUPPLY SHUT-OFF SYSTEM

(71) Applicants: Ricky H Holley, Greenwood, SC (US); David O Harmon, Conway, SC (US)

(72) Inventors: Ricky H Holley, Greenwood, SC (US); David O Harmon, Conway, SC (US)

( * ) Notice: Subject to any disclaimer, the term of this patent is extended or adjusted under 35 U.S.C. 154(b) by 0 days.

(21) Appl. No.: 13/954,436

(22) Filed: Jul. 30, 2013

Related U.S. Application Data (60) Provisional application No. 61/677,857, filed on Jul. 31, 2012.

(51) Int. Cl.
*F16K 31/02* (2006.01)
*E03B 7/07* (2006.01)

(52) U.S. Cl.
CPC ..................... *E03B 7/071* (2013.01)
USPC .......................... 137/613; 137/312

(58) Field of Classification Search
USPC ................. 137/312, 613, 553; 251/129.04
See application file for complete search history.

(56) References Cited

U.S. PATENT DOCUMENTS

| | | | |
|---|---|---|---|
| 4,805,662 A * | 2/1989 | Moody | 137/312 |
| 4,942,896 A * | 7/1990 | Slusser | 137/360 |
| 5,267,587 A | 12/1993 | Brown | |
| 5,661,623 A * | 8/1997 | McDonald et al. | 361/42 |
| 5,881,755 A | 3/1999 | Dieringer | |
| 6,186,162 B1 * | 2/2001 | Purvis et al. | 137/312 |
| 6,209,576 B1 | 4/2001 | Davis | |
| 6,237,618 B1 | 5/2001 | Kushner | |
| 6,532,979 B1 | 3/2003 | Richter | |
| 6,621,671 B2 * | 9/2003 | Gershen et al. | 361/42 |
| 6,708,722 B1 | 3/2004 | Goodenough | |
| 6,812,848 B2 | 11/2004 | Candela | |
| 6,945,274 B1 | 9/2005 | Davis | |
| 7,030,767 B2 | 4/2006 | Candela | |
| 7,900,650 B1 | 3/2011 | Wilson | |
| 8,074,668 B2 * | 12/2011 | Alexander et al. | 134/113 |
| 8,201,572 B2 * | 6/2012 | Segal | 137/15.11 |
| 2011/0248199 A1 | 10/2011 | Konovalski | |

FOREIGN PATENT DOCUMENTS

| | | |
|---|---|---|
| EP | 0051874 A1 | 5/1982 |
| GB | 2276656 A | 5/1994 |
| JP | 61-59075 A | 3/1986 |
| JP | 50-59753 A | 3/1993 |

OTHER PUBLICATIONS

Flo-Guard Inc.; Web site print outs from www.floguard.com/about_system.html; visited Apr. 20, 2012; copyright Flo-Guard Inc.; (3 pages).

* cited by examiner

*Primary Examiner* — Kevin Lee
(74) *Attorney, Agent, or Firm* — Neal P Pierotti; Metz Lewis Brodman Must O'Keefe (57) ABSTRACT

A water supply shut-off system is provided that includes a water line, a main shut-off valve, and a valve located downstream from the main shut-off valve that has an open position that allows water to flow through the valve, and a closed position that prevents water flow through the valve. A switch is in electrical communication with the valve through a wired connection. Actuation of the switch causes the valve to open and close. The switch is not in communication with the main shut-off valve. A wall outlet for obtaining electricity is also included and has female receivers. A ground fault interrupter is plugged into the wall outlet and is removably attached to the wall outlet to be capable of being unplugged. A wire is connected to the switch for electricity to flow from the wall outlet to the switch.

21 Claims, 3 Drawing Sheets

FIG.1

WATER SUPPLY SHUT-OFF SYSTEM

CROSS REFERENCE TO RELATED APPLICATIONS

This application claims the benefit of U.S. Application Ser. No. 61/677,857 filed on Jul. 31, 2012 and entitled, "Water Supply Shut-Off System." U.S. Application Ser. No. 61/677,857 is incorporated by reference herein in its entirety for all purposes.

FIELD OF THE INVENTION

The present invention relates generally to a water supply shut-off system for a residence or other structure. More particularly, the present application involves a water supply shut-off system that includes an electric solenoid valve and a switch that allows a home owner to easily shut-off the supply of potable water to a residence and to verify that the water has in fact been shut-off.

BACKGROUND

Water can damage a home in a variety of manners. For example, a storm can damage a roof of a home and provide a path for rain water to enter the home and damage electrical systems, contents, and ceilings. Fixtures and devices in the home such as sink faucets, toilets, showers, dishwashers, refrigerators, and hot water heaters can malfunction or be unintentionally left in an activated condition once the homeowner leaves. These devices use water and thus provide another entry point for water to be unintentionally introduced into the home. Water unintentionally released from these devices can damage floors, walls, ceilings, and contents of the home and result in tens of thousands of dollars in damage and cleanup costs. As a result, homeowners are often apprehensive of water damaging their home.

One way to minimize unintentional water damage is to cut off the supply of water to the home. The homeowner could do this on a daily basis when exiting the home, or may only do this when leaving the home unattended for some extended period of time such as when he or she is on vacation. If the supply of water to the home is ceased, the amount of water damage from water unintentionally released from fixtures and devices in the home will be greatly minimized or even eliminated. In this regard, a main line shut-off valve is generally located somewhere between the home and a water line under or proximate a street next to the home. Unfortunately, the homeowner may not know the location of, or even the existence of, this main line shut-off valve. Still further, even if the homeowner knows the location of the main line shut-off valve, this valve may require a special wrench or other tools to effect its opening and closing. The homeowner may not have these special tools or may not be able to properly use them to cause the main line shut-off valve to be opened or closed. The location of the main line shut-off valve can be such that it is inconvenient or impractical to shut-off the water supply every time the user leaves the home or every time the user goes on vacation. Since homeowners will rarely or never turn off the main line shut-off valve, water will still be supplied to the home and the home will still be vulnerable to water damage from this source. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a water supply shut-off system 5 that can be used by a homeowner to shut-off the supply of water to the home to prevent water damage to the home and to provide piece of mind and assurance to the homeowner when away from the home that water damage is much less likely or impossible to occur. The water supply shut-off system 5 can be actuated by the homeowner from inside of the home with the simple actuation of a switch 58 that can be located in a convenient area of the home. The water supply shut-off system 5 can be provided with one or more visual indicators that the user can view to determine that the system 5 is in fact actuated and is in fact preventing the flow of water to the home. The system 5 can be provided with a manual actuation so that if electrical power were not present, the homeowner can still turn on the system 5 to ensure that water will not be capable of flowing into the home. Although described as being used by a homeowner for use in protecting his or her home, the water supply shut-off system 5 can be used in any type of structure by anyone that wants to ensure the water supply is shut-off. For example, the water supply shut-off system 5 can be used by a business owner to shut-off the supply of water to his or her business, by an employee or other person to shut-off the supply of water to a structure, or by a cruise line to shut-off the supply of water to portions of a boat that would sustain more damage than other portions of a boat if water were to be introduced.

Figure 1:
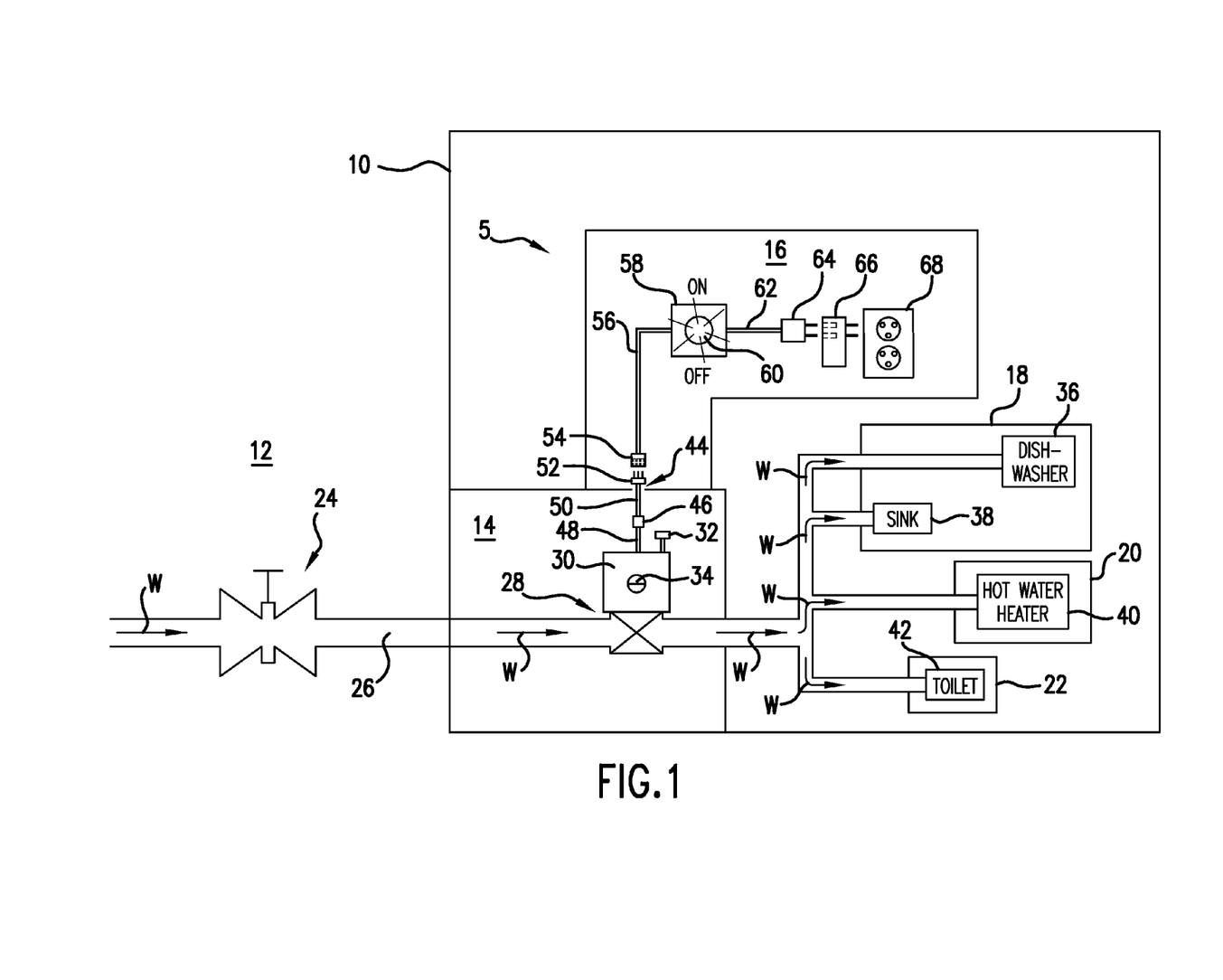
FIG. 1 is a schematic view of a water supply shut-off system in accordance with one exemplary embodiment.

One exemplary embodiment of the water supply shut-off system 5 is shown with reference to FIG. 1. The system 5 is located completely inside of the house 10 and no portion of the system 5 is located outside of the house 10. In other embodiments, however, some or all of the components of the water supply shut-off system 5 may be located outside of the house 10. A water line 26 supplies water to the house 10 in a known manner. In this regard, a main shut-off valve 24 is located outside 12 of the house 10 and in the water line 26 so that actuation of the main shut-off valve 24 will stop the flow of water therethrough. The homeowner may turn the main shut-off valve 24 into an open or closed position to allow or prevent the flow of water into the house 10. The main shut-off valve 24 may be hidden from view or require special tools to cause it to be opened or closed. Further, the main shut-off valve 24 is outside 12 of the house and may not be convenient for the homeowner to actuate when the flow of water is desired to be shut-off. Although described as being located outside 12, the main shut-off valve 24 may in fact be located inside of the house 10 in some instances. However, the water supply shut-off system 5 may still be employed because it may be more convenient than actuating valve 24, may serve as a back-up to the valve 24 and be easier to operate than valve 24, and may provide piece of mind to the homeowner.

The water line 26 extends downstream from the main shut-off valve 24 and enters the interior of the house 10. Several branches of the water line 26 extend into different rooms of the house 10 to provide water to various fixtures and devices. As shown, a first branch of the water line 26 extends into a third room 18 of the house 10 and provides water to a dishwasher 36 for use in washing dishes of the homeowner. A second branch of the water line 26 extends also into the third room 18 and supplies water to a sink 38 of the house 10. A third branch extends into a fourth room 20 of the house 10 into which a hot water heater 40 is located and is supplied with the water. A fourth branch feeds a toilet 42 located in a fifth room 22 of the house 10. Various other fixtures and devices in the same or different rooms from those illustrated may be present in other embodiments and can be supplied with water in other embodiments from the water line 26.

The water supply shut-off system 5 can be provided to prevent the supply of water to the various fixtures and devices 36, 38, 40 and 42. The water supply shut-off system 5 is located upstream from the fixtures and devices 36, 38, 40 and 42 and prevents the flow of water thereto. The water supply shut-off system 5 may include an electric solenoid valve 28 that is located within a first room 14 of the house 10. The electric solenoid valve 28 may have any full port valve connection size. The electric solenoid valve 28 can be opened and closed in order to allow the flow of water through the electric solenoid valve 28 and in order to prevent the flow of water past the electric solenoid valve 28. The actuator 30 is electrically actuated to cause the electric solenoid valve 28 to open and close. However, it may be the case that power is lost to the house 10 or is otherwise cut or prevented from powering the actuator 30. When power is not present for powering the actuator 30, a manual override wheel 32 is available and can be manually moved upwards. In other embodiments, when power is lost the manual override wheel 32 may be lifted up to operate and returned to its recessed position for electric operation when power is restored. The manual override wheel 32 cannot be used when power is supplied to the actuator 30. The user may turn the manual override wheel 32 to the right or left until the valve is opened or closed as desired. The user may observe a black line on a visual indicator 34 that informs the user as to whether the electric solenoid valve 28 is open or closed. If the black line is horizontal, the electric solenoid valve 28 is open and water can flow therethrough, if the black line of the visual indicator 34 is vertical, the electric solenoid valve 28 is off and water cannot flow through the valve 28. The user may then press the hand wheel down so that the electric solenoid valve 28 can work once power is restored. Although described as indicating "open" or "closed", the visual indicator 34 may also in some arrangements indicate that the electric solenoid valve 28 is partially opened, and thus partially closed, when the valve 28 is arranged to work in this manner.

Figure 2:
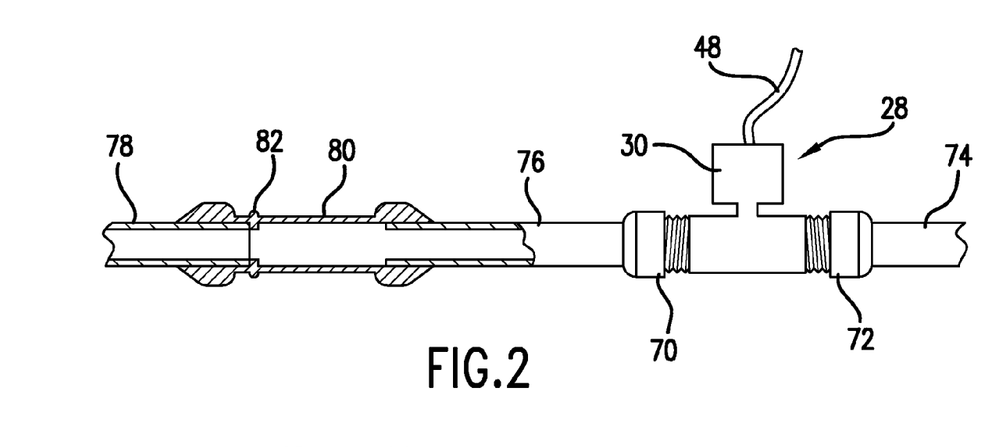
FIG. 2 is a side view, partially in cross-section, of the attachment of the water pipe to the solenoid valve.

The water supply shut-off system 5 can be supplied as a kit that the homeowner can purchase and can install onto his or her existing water line 26. Alternatively, the water supply shut-off system 5 can be installed with new construction in the home so that the house 10 always has a water supply shut-off system 5 present. With reference to FIG. 2, if installing into an existing water line 26 the user may first insert a first connector 70 into the inlet port of the solenoid valve 28, and a second connector 72 into the outlet port of the solenoid valve 28. The connectors 70 and 72 may be two male adaptors with a threaded connection and can be part number U134 having size ¾"×¾" MNPT under the trademark SHARK-BITE® supplied by SharkBite having offices located at 2727 Paces Ferry Rd SE, Suite 1750, Building Two, Atlanta, Ga., USA. It is to be understood that the connectors 70 and 72 need not be of this particular type in accordance with other exemplary embodiments and that this is only one such selection of the connectors 70 and 72.

After connection of the first and second connectors 70 and 72 and with the main shut-off valve 24 turned off, the user may mark the water line 26 with two marks that are 12.5 inches apart. Next, the user may measure 6.5 inches from one of the marks and make a third mark on the water line 26. This third mark will be between the first two marks. The user may then cut the water line 26 at the third mark. Next, the user may cut the water line 26 at the 0 mark, and then cut the water line 26 at the 12.5 inch mark so that all three of the marks are now cut.

The 6.5 inch piece of the water line 26 may be referred to as a second water pipe piece 76 and may be inserted into the first connector 70 and held thereon via the gripping elements of the first connector 70. The first connector 70 and second connector 72 are push type connectors that attach onto the pipe when inserted therein via gripping elements. The second water pipe piece 76 will be rigidly held by the first connector 70. The user may then obtain a coupling 80 that in some embodiment may be a slip coupling that is ¾" in size having part number U3016 provided by Sharkbite. The coupling 80 has a stop ring 82 that the user will arrange so that it is positioned farther away from the electric solenoid valve 28 so that more of the coupling 80 is closer to the electric solenoid valve 28 on one side of the stop ring 82 than the rest of the coupling 80 on the other side of the stop ring 82. The coupling 80 is inserted over the second water pipe piece 76.

A restraint release (not shown) is then placed by the user around the second water pipe piece 76 proximate to the end of the coupling 80. This restraint release may be provided by Sharkbite and can be used to release the grip of the coupling 80 onto pipe surrounded by the coupling 80. With the restraint release in place, the user may then connect the second connector 72 onto the first water pipe piece 74 such that the second connector 72 and the first water pipe piece 74 are rigidly attached to one another. The second connector 72 has gripping elements that effect this rigid attachment. The pieces 74 and 76 may be made of brass in certain exemplary embodiments. The connectors 70 and 72 can be provided so that they are not made of copper and so that they are not "sweating copper" components.

Next, the user may slide the other end of the coupling 80 over the third water pipe piece 78. The user may then urge the restraint release against the coupling 80 to unlock the coupling 80 and cause it to slide along the second water pipe piece 76. The user may continue to urge the coupling 80 via the restraint release to cause the coupling 80 to slide along the third water pipe piece 78 until the end of the third water pipe piece 78 engages the stop ring 82. With this final step, the electric solenoid valve 28 is installed into the water line 26. However, it is to be understood that other methods of installing the electric solenoid valve 28 into the water line 26 can be used in accordance with other exemplary embodiments.

Figure 3:
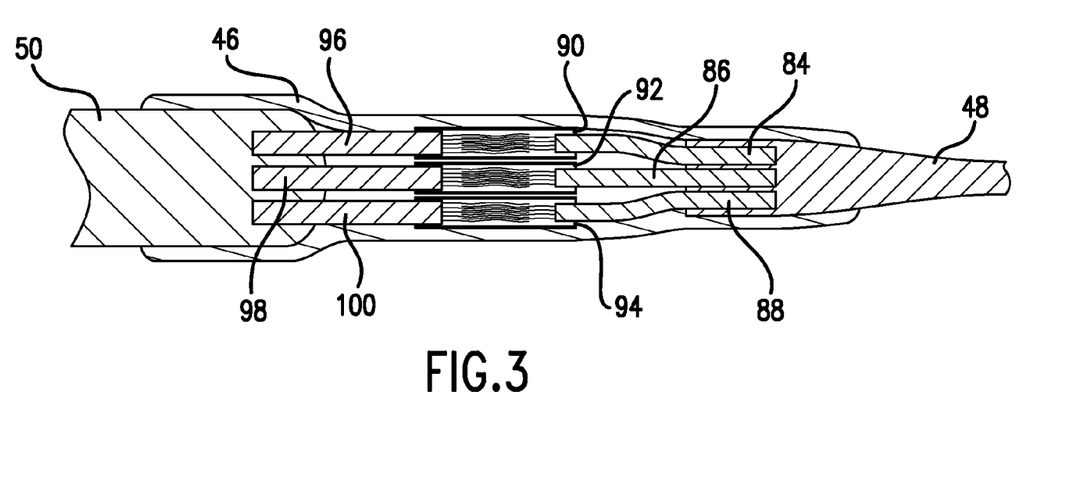
FIG. 3 is a cross-sectional view of the connection between a hard wired wire of a solenoid valve and a larger diameter extension wire.

A valve hard wired wire 48 extends from the electric solenoid valve 28 and is shown in greater detail in FIG. 3. The valve hard wired wire 48 includes a live line 84, a return line 86, and a ground line 88. A larger diameter extension wire 50 is spliced to and connected to the hard wired wire 48. The larger diameter extension wire 50 has a larger diameter than the hard wired wire 48. The larger diameter extension wire 50 has a live line 96, a return line 98, and a ground line 100. These lines 96, 98 and 100 are each of a larger diameter than the respective lines 84, 86 and 88 of the valve hard wired wire 48. The live lines 96 and 84 are connected to one another so that they are in electrical communication and their points of attachment are secured by a connecting sleeve 90. The return lines 86 and 98 are attached to one another and are in electrical communication with one another. A connecting sleeve 92 surrounds the connection between lines 86 and 98. The ground lines 88 and 100 are likewise placed into electrical communication with one another and their attachment point is surrounded by a connecting sleeve 94.

The attachment points of the various lines 84, 86, 88, 96, 98 and 100 are effected by metal wires that are in contact to effect the electrical connection. Insulating sleeves extend from the connecting metal wires back into the wires 48 and 50 although only a portion of this extension is shown for purposes of clarity. A heat shrink tube 46 may be placed around the connecting sleeves 90, 92 and 94 and the ends of the wires 48 and 50. The heat shrink tube 46 can be heated so that it shrinks and engages the outer surfaces of the wires 48 and 50 along with the connecting sleeves 90, 92 and 94. The heat shrink tube 46 will also engage portions of the various lines 84, 86, 88, 96, 98 and 100.

The opposite end of the larger diameter extension wire 50 has a male connector 52 that is removable so that it can be attached to and removed from the larger diameter extension wire 50. Removal of the male connector 52 may be done so that a small hole 44 in the wall of the first room 14 can be made. The hole 44 need only be large enough to accommodate the size of the larger diameter extension wire 50. If the male connector 52 could not be removed, a hole that must be larger than the male connector 52 must be made in the wall of the first room 14. Removal of the male connector 52 allows for a much smaller hole 44 to be made in the wall of the first room 14 so that a better cosmetic appearance is achieved.

The larger diameter extension wire 50 can be run through the hole 44 in the wall of the first room 14 and into the second room 16 of the house 10. The male connector 52 can be attached to a female connector 54 of a switch wire 56, that may be a hard wired wire, to place the wires 50 and 56 into electrical communication with one another. The hard wired wire 56 may be part of the switch 58 that is included with the water supply shut-off system 5. The switch 58 controls the "open" or "closed" positions of the electric solenoid valve 28 and thus actuation of the switch 58 determines which state the electric solenoid valve 28 is placed. The switch 58 in one embodiment may be an illuminated on/off rocker switch having part number SPST16A/125VAC provided by Radioshack having offices located at 300 RadioShack Circle, Forth Worth, Tex., USA. However, it is to be understood that the switch 58 need not be this particular switch 58 in other arrangements. The switch 58 will be illuminated when it is on and thus supplying electricity to the electric solenoid valve 28. Illumination of the switch 58 will provide the user with assurance that the water supply shut-off system 5 is provided with electricity and is working. Further, the illumination may allow for the user to know that the water supply shut-off system 5 is in an on state that causes the electric solenoid valve 28 to be closed and thus prevent water from moving past the electric solenoid valve 28 to the various fixtures and devices of the house 10. Although described as being in separate rooms 14 and 16, the switch 58 and the electric solenoid valve 28 may be in the same room 14 of the house 10 and thus the hole 44 is not necessary.

Figure 6:
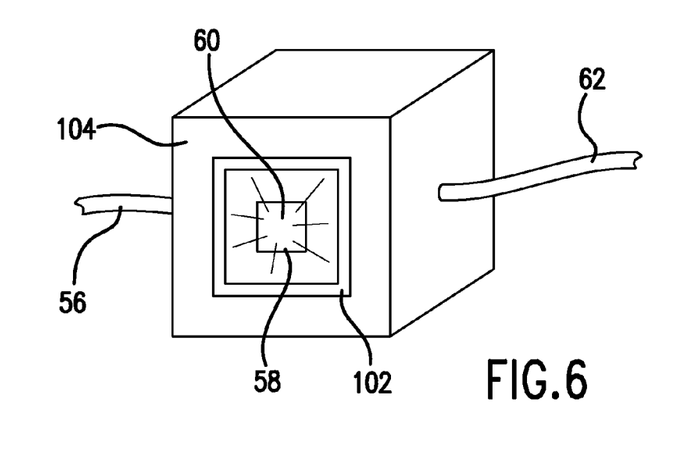
FIG. 6 is a perspective view of a box that houses a switch that is water resistant in accordance with certain exemplary embodiments.

In accordance with another exemplary embodiment, the switch 58 is illustrated with reference to FIG. 6 and is housed within a box 104. Electrical lines 62 and 56 are in communication with switch 58. A gasket 102 that surrounds the perimeter of the front surface of the switch 58 functions to seal the switch 58 to the box 104 so that the box 104 and switch 58 are water resistant. The box 104 may be cubed shaped with all closed sides except for the open front face in which the switch 58 is positioned. The electrical lines 62 and 56 may extend through holes in the two side faces of the box 104 or may be in electrical communication with the switch 58 without having to extend through any apertures of the box 104. In accordance with certain exemplary embodiments, the switch 58 may be a waterproof illuminated rocker switch available from NTE Electronics, Inc, having offices located at 44 Farrand Street, Bloomfield, N.J., 07003, USA. However, it is to be understood that the switch 58 need not be this particular switch 58 in other arrangements.

The switch 58 can be configured so that when it is actuated and the electric solenoid valve 28 is open to allow water flow, the switch 58 is illuminated and is blue in color. The blue illumination will serve as a reminder to the user that water flow is allowed through the system 5. If the user actuates switch 58 to cause the valve 28 to close to prevent water flow, the light of the switch 58 will turn off and there will be no illumination. The switch 58 can be water proof so that it is robust in a damp or moist environment and will continue to function.

In some embodiments, the switch 58 has a pressing portion 60 that can be touched by the user. If the user presses an upper portion of the pressing portion 60, the pressing portion 60 will move or depress upwards into an "on" position to cause the electric solenoid valve 28 to close off the supply of water. If the user presses the lower half of the pressing portion 60, the pressing portion will depress or move into a lower position to cause the switch 58 to be placed into an "off" position in which the electric solenoid valve 28 will be opened to allow water to be supplied to the various fixtures and devices 36, 38, 40 and 42. Placement of the switch 58 to the "off" position may cause the switch 58 to no longer be illuminated. This will inform the user that the water supply shut-off system 5 is not active. The switch 58 can be configured in a variety of manners. For example, if it is in an "on" position to prevent water from flowing the switch 58 may be illuminated green, while if the switch is in an "off" position to allow water to flow it may be illuminated red. In other embodiments, if the switch 58 is situated to allow water to flow through the electric solenoid valve 28 it may be illuminated blue. If the switch 58 were positioned so that water could not flow through the electric solenoid valve 28 it may be illuminated red or may not be illuminated at all. Although described as being illuminated, it is to be understood that the switch 58 need not be an illuminated switch in other exemplary embodiments. The switch 58 may be a toggle switch, a rocker switch, a dial, a push button, or a keypad or variously configured in accordance with different exemplary embodiments. The switch 58 can be arranged so that it has only an "on" and "off" position with no intermediate position and can be arranged so that it is manually actuated by the user and is not remotely actuated by a remote control, sensing device, or computer.

The switch 58 can be located in a convenient location in the second room 16 so that it can be easily actuated by the homeowner. Although described as being a room 16 separate from the room 14 into which the electric solenoid valve 28 is located, the switch 58 and the electric solenoid valve 28 can be in the same room 14 or 16 in the house 10. Further, switch 58 and/or electric solenoid valve 28 can be located in the same room 18, 20 or 22 into which the fixtures or devices 36, 38, 40, or 42 are located. The user may thus actuate the system 5 from a room 16 that is convenient to the user and if this is the case, the system 5 will be more frequently used to protect the home from water damage.

A wire 62 is present and is in electrical communication with the switch 58 to provide power to the switch 58. The wire 62 may be a 14 gauge 50 foot extension cord with a power-check indicator light provided by Fourman Industries, Inc. having offices located at 4733 Torrance Blvd., #566, Torrance, Calif., USA. However, it is to be understood that the wire 62 need not be this particular type and make of wire in other arrangements and that this description is only for sake of example. A male connector 64 is at the end of the wire 62 and may illuminate when power is transferred through the wire 62. This may function as an indication to the user that the wire 62 is providing power and may assure the user that the system 5 is operational and functioning.

The system 5 may include a ground fault interrupter 66 that is plugged into a wall outlet 68. The arrangement may be shown in greater detail in FIGS. 4 and 5. A standard wall outlet 68 includes two outlets that each have three holes, one for live, one for return, and a lower one for ground. The ground fault interrupter 66 includes three male prongs that are inserted into their counterpart female receptacle in the wall outlet 68. The ground fault interrupter 66 on an opposite side includes three female receptacles that receive the male prongs of the male connector 64. The male prongs and the female receptacles are live, return, and ground. If the ground fault interrupter 66 notices a sufficient discrepancy between the amount of current flowing from live to return (sometimes called hot to neutral) it will trip the circuit and stop electricity flow. The ground fault interrupter 66 provides additional assurance to the user because it increases safety of the system 5 and reduces the chances of electrical shock thereto.

Figure 4:
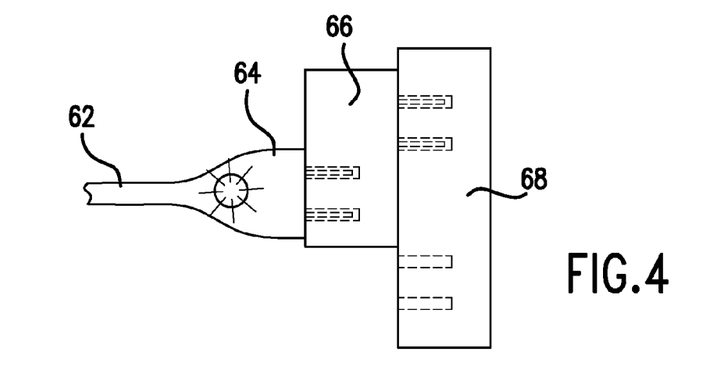
FIG. 4 is a side view of a male connector and a ground fault interrupter connected to a wall outlet.
Figure 5:
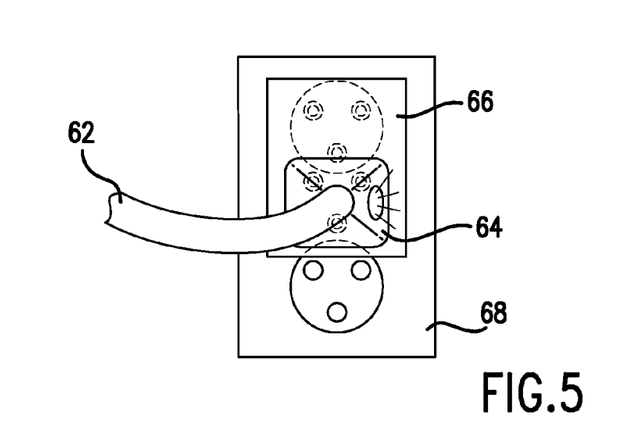
FIG. 5 is a front plan view of the male connector, ground fault interrupter, and wall outlet of FIG. 4.

The ground fault interrupter 66 is easily attachable and detachable to and from the wall outlet 68, and the male connector 64 is easily attachable and detachable to and from the ground fault interrupter 66. Illumination of the male connector 64 informs the user that power is being supplied from the wall outlet 68 through the ground fault interrupter 66 and into the wire 62. It is to be understood that other exemplary embodiments are possible in which a ground fault interrupter 66 is not present.

The water supply shut-off system 5 can be arranged so that a transformer is not present. As such, the voltage that comes out of the wall outlet 68 is used by the system 5. This voltage is usually 110 volts, but may be from 110 volts-120 volts in some embodiments. In other embodiments, the voltage from the wall outlet 68 may be from 100-110, from 105-115, from 115-125, or up to 130 volts. The system 5 may be set up so that a transformer is not present in any portion of the system 5 such that the system 5 uses whatever voltage is provided by the wall outlet 68 so that the voltage used is not stepped down from the voltage of the wall outlet 68. The voltage supplied to the switch 58 and to the electric solenoid valve 28 may be 115 volts or may be whatever voltage is provided by the wall outlet 68.

The water supply shut-off system 5 may use alternating current and not direct current. In this regard, the current that drives the switch 58 and the actuator 30 of the electric solenoid valve 28 can be alternating current and not direct current. Further the current that is transferred through the wires 48, 50, 56 and 62 and the connectors 52, 54, and 64 may be alternating current and not direct current. The current that is transferred through the ground fault interrupter 66 may be alternating and not direct current.

The water supply shut-off system 5 can be configured so that a by-pass is not present. In this regard, the water line 26 has a path across the electric solenoid valve 28 and if the electric solenoid valve 28 is closed, it is impossible for water to flow around the electric solenoid valve 28 to the devices and fixtures 36, 38, 40 and 42. However, in other embodiments, a by-pass of the electric solenoid valve 28 is present so that if the valve 28 is closed, the by-pass can be opened to allow water to flow around the valve 28 to the various devices and fixtures 36, 38, 40 and 42. The by-pass is a water line that would have an inlet upstream from the electric solenoid valve 28 and an outlet downstream from the electric solenoid valve 28 so that water can in effect flow around the electric solenoid valve 28.

The electric solenoid valve 28 can be normally closed. In this regard, if electricity is not supplied to the actuator 30 the valve 28 is closed and water is prevented from flowing past the valve 28. Electricity supplied to the electric solenoid valve 28 may cause the electric solenoid valve 28 to open to allow water to flow. However, in other embodiments the electric solenoid valve 28 may be normally open so that if power is not on or lost, water will be able to flow to the devices and fixtures 36, 38, 40 and 42. If power is available, the electric solenoid valve 28 can be closed to prevent water flow.

Electricity from the wall outlet 68 is transferred to the switch 58 via the wire 62. If the switch 58 is "on" the electricity is then sent via the hardwired wire 56 and the larger diameter extension wire 50 to the actuator 30 to change the position of the actuator 30 from open to close or from close to open. The electricity may also cause the electric solenoid valve 28 to maintain its current position.

The system 5 can be designed so that none of the components in the system 5 include wireless communication or a remote control. In this regard, none of the components such as the electric solenoid valve 28, the switch 58, the wall outlet 68, or the ground fault interrupter 66 include a remote control or include any wireless signals to effect their functioning.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A water supply shut-off system, comprising:
an electric solenoid valve movable between an open position that allows water to flow through the electric solenoid valve and a closed position to prevent water from flowing through the electric solenoid valve, wherein the electric solenoid valve has a manual override for opening and closing the valve in the event of power failure, and wherein the electric solenoid valve has a visual indicator that indicates the position of the valve in relation to the open or closed position of the electric solenoid valve;
a switch in electrical communication with the electric solenoid valve, wherein the switch is illuminated, wherein the switch is water resistant for use in damp conditions;
a wire in electrical communication with the switch, wherein the wire has a male connector that is illuminated;
a ground fault interrupter that is attached to a wall outlet and is in electrical communication with the wall outlet and the male connector of the wire;
a first connector that is attached to the electric solenoid valve, wherein the first connector is not made of sweating copper;
a second connector that is attached to the electric solenoid valve, wherein the second connector is not made of sweating copper; and
a coupling that is attached to the first connector.

2. The water supply shut-off system as set forth in claim 1, wherein the ground fault interrupter is releasably attachable to the wall outlet.

3. A water supply cut-off system, comprising:
a water line;
a main shut-off valve movable between a main shut-off valve open position that allows water to flow through the water line, and a main shut-off valve closed position that prevents water flow through the water line;
a valve located downstream from the main shut-off valve, wherein the valve has an open position that allows water to flow through the valve, and a closed position that prevents water flow through the valve;
a switch that is in electrical communication with the valve through a wired connection, wherein the switch is actuated by a user to cause the valve to move from the open position to the closed position, and wherein the switch is actuated by the user to cause the valve to move from the closed position to the open position, wherein the switch is not in communication with the main shut-off valve such that the switch does not move the main shut-off valve between the main shut-off valve open position and the main shut-off valve closed position;
a wall outlet for obtaining electricity, wherein the wall outlet has female receivers;
a ground fault interrupter that is plugged into the wall outlet, wherein the ground fault interrupter is removably attached to the wall outlet such that the ground fault interrupter is capable of being unplugged from the wall outlet, wherein the ground fault interrupter has male prongs that are received by the female receivers of the wall outlet when the ground fault interrupter is plugged into the wall outlet; and
a wire connected to the switch, wherein electricity from the wall outlet flows through the ground fault interrupter and the wire to the switch in order to power the switch, wherein the wire and the ground fault interrupter are releasably attachable by bring plugged into one another through a plug connection to allow electricity to flow from the ground fault interrupter to the wire, wherein the plug connection is disengaged to detach the wire and the ground fault interrupter to prevent electricity from flowing from the ground fault interrupter to the wire.

4. The water supply cut-off system as set forth in claim 3, wherein the ground fault interrupter has three male prongs wherein a first of the male prongs is a live male prong, a second of the male prongs is a return male prong, and a third of the male prongs is a ground male prong, wherein the ground fault interrupter stops the flow of electricity through the ground fault interrupter if the ground fault interrupter senses a sufficient discrepancy between an amount of current flowing from live to return.

5. The water supply cut-off system as set forth in claim 3, wherein the valve is an electric solenoid valve.

6. The water supply cut-off system as set forth in claim 3, further comprising:
a box that has an interior, wherein the switch is located in the interior, wherein the box has an open front face; and
a gasket that surrounds a perimeter of a front face of the switch and seals the switch to the box so that the box and the switch are water resistant;
wherein the switch is illuminated and is manually actuated by a user of the water supply cut-off system.

7. The water supply shut-off system as set forth in claim 3, wherein electricity from the wall outlet travels along a path that extends from the wall outlet through the ground fault interrupter, the wire, and the switch to the valve, wherein a transformer is not present along the path from the wall outlet to the valve, wherein alternating current is present along the path from the wall outlet to the valve and wherein direct current is not present along the path from the wall outlet to the valve.

8. The water supply shut-off system as set forth in claim 3, wherein the water line extends from the main shut-off valve to the valve and downstream past the valve, wherein a by-pass is not present in the water line.

9. A water supply cut-off system, comprising:
a water line;
a main shut-off valve movable between a main shut-off valve open position that allows water to flow through the water line, and a main shut-off valve closed position that prevents water flow through the water line;
a valve located downstream from the main shut-off valve, wherein the valve has at open position that allows water to flow through the valve, and a closed position that prevents water flow through the valve;
a switch that is in electrical communication with the valve through a wired connection, wherein the switch is actuated by a user to cause the valve to move from the open position to the closed position, and wherein the switch is actuated by the user to cause the valve to move from the closed position to the open position, wherein the switch is not in communication with the main shut-off valve such that the switch does not move the main shut-off valve between the main shut-off valve open position and the main shut-off valve closed position;
a wall outlet for obtaining electricity, wherein the wall outlet has female receivers;
a ground fault interrupter that is plugged into the wall outlet, wherein the ground fault interrupter is removably attached to the wall outlet such that the ground fault interrupter is capable of being unplugged from the wall outlet, wherein the ground fault interrupter has male prongs that are received by the female receivers of the wall outlet when the ground fault interrupter is plugged into the wall outlet; and a wire connected to the switch, wherein electricity from the wall outlet flows through the ground fault interrupter and the wire to the switch in order to power the switch;

wherein the wire has a male connector at one end that is received within a female connector of the ground fault interrupter to place the wire in electrical communication with the ground fault interrupter, wherein the male connector is illuminated.

10. A water supply cut-off system, comprising:

a water line;

a main shut-off valve movable between a main shut-off valve open position that allows water to flow through the water line, and a main shut-off valve closed position that prevents water flow through the water line;

a valve located downstream from the main shut-off valve, wherein the valve has an open position that allows water to flow through the valve, and a closed position that prevents water flow through the valve;

a switch that is in electrical communication with the valve through a wired connection, wherein the switch is actuated by a user to cause the valve to move from the open position to the closed position, and wherein the switch is actuated by the user to cause the valve to move from the closed position to the open position, wherein the switch is not in communication with the main shut-off valve such that the switch does not move the main shut-off valve between the main shut-off valve open position and the main shut-off valve closed position;

a wall outlet for obtaining electricity, wherein the wall outlet has female receivers;

a ground fault interrupter that is plugged into the wall outlet, wherein the ground fault interrupter is removably attached to the wall outlet such that the ground fault interrupter is capable of being unplugged from the wall outlet, wherein the ground fault interrupter has male prongs that are received by the female receivers of the wall outlet when the ground fault interrupter is plugged into the wall outlet;

a wire connected to the switch, wherein electricity from the wall outlet flows through the ground fault interrupter and the wire to the switch in order to power the switch;

a valve hard wired wire that extends from the valve, wherein the hard wired wire has a live line, a return line, and a ground line;

a larger diameter extension wire that has a diameter larger than a diameter of the hard wired wire, wherein the larger diameter extension wire has a live line, a return line, and a ground line;

a first connecting sleeve that is non-conductive and that surrounds and engages the live lines of the hard wired wire and the larger diameter extension wire, wherein the live line of the hard wired wire engages and is in electrical communication with the live line of the larger diameter extension wire;

a second connecting sleeve that is non-conductive and that surrounds and engages the return lines of the hard wired wire and the larger diameter extension wire, wherein the return line of the hard wired wire engages and is in electrical communication with the return line of the larger diameter extension wire;

a third connecting sleeve that is non-conductive and that surrounds and engages the ground lines of the hard wired wire and the larger diameter extension wire, wherein the ground line of the hard wired wire engages and is in electrical communication with the ground line of the larger diameter extension wire; and a heat shrink tube that surrounds the first connecting sleeve, the second connecting sleeve, and the third connecting sleeve, wherein the heat shrink tube surrounds a portion of and engages the larger diameter extension wire and surrounds a portion of and engages the hard wired wire.

11. The water supply cut-off system as set forth in claim 10, wherein the larger diameter extension wire has a male connector on an end, wherein the male connector is releasably attachable to the larger diameter extension wire such that the male connector can be attached to and removed from the end of the larger diameter extension wire;

further comprising a switch wire that has a female connector on one end that is attached to the male connector of the larger diameter extension wire, wherein the switch wire is a hard wired wire and is attached to the switch, wherein the valve is in electrical communication with the switch through the switch wire, the larger diameter extension wire, and the valve hard wired wire.

12. The water supply cut-off system as set forth in claim 11, wherein the valve hard wired wire, the valve, the first connecting sleeve, the second connecting sleeve, the third connecting sleeve, and the heat shrink tube are located inside of a first room of a house; and wherein the male connector of the larger diameter extension wire, the switch wire, the switch, the wire, the ground fault interrupter, and the wall outlet are located outside of the first room of the house.

13. A water supply cut-off system, comprising:

a water line;

a main shut-off valve movable between a main shut-off valve open position that allows water to flow through the water line, and a main shut-off valve closed position that prevents water flow through the water line;

a valve located downstream from the main shut-off valve, wherein the valve has an open position that allows water to flow through the valve, and a closed position that prevents water flow through the valve;

a switch that is in electrical communication with the valve through a wired connection, wherein the switch is actuated by a user to cause the valve to move from the open position to the closed position, and wherein the switch is actuated by the user to cause the valve to move from the closed position to the open position, wherein the switch is not in communication with the main shut-off valve such that the switch does not move the main shut-off valve between the main shut-off valve open position and the main shut-off valve closed position;

a wall outlet for obtaining electricity, wherein the wall outlet has female receivers;

a ground fault interrupter that is plugged into the wall outlet, wherein the ground fault interrupter is removably attached to the wall outlet such that the ground fault interrupter is capable of being unplugged from the wall outlet, wherein the ground fault interrupter has male prongs that are received by the female receivers of the wall outlet when the ground fault interrupter is plugged into the wall outlet; and a wire connected to the switch, wherein electricity from the wall outlet flows through the ground fault interrupter and the wire to the switch in order to power the switch;

wherein:

the main shut-off valve is located outside of a house;

wherein the valve is located inside of a first room of the house; and wherein the switch, the wire, the ground fault interrupter, and the wall outlet are located inside of a second room of the house.

14. A water supply cutoff system, comprising:
a water line;
a main shut-off valve movable between a main shut-off valve open position that allows water to flow through the water line, and a main shut-off valve closed position that prevents water flow through the water line;
an electric solenoid valve located downstream from the main shut-off valve, wherein the electric solenoid valve has an open position that allows water to flow through the electric solenoid valve, and a closed position that prevents water flow through the electric solenoid valve;
a switch that is in electrical communication with the electric solenoid valve through a wired connection, wherein the switch is actuated by a user to cause the electric solenoid valve to move from the open position to the closed position, and wherein the switch is actuated by the user to cause the electric solenoid valve to move from the closed position to the open position, wherein the switch is not in communication with the main shut-off valve such that the switch does not move the main shut-off valve between the main shut-off valve open position and the main shut-off valve closed position, wherein the switch is manually actuated by a user, and wherein wireless signals are not present to effect the opening or closing of the electric solenoid valve;
wherein the electric solenoid valve is located in a first room of a house, and wherein the switch is located in a second room of the house;
a first wire through which electrical energy is transferred into the switch that electrically powers the switch; and
a second wire through which electrical energy from the switch is transferred to the electric solenoid valve to cause the electric solenoid valve to move.

15. The water supply cut-off system as set forth in claim 14, wherein the water line extends to a sink that is downstream from the electric solenoid valve, wherein a by-pass is not present in the water line from the main shut-off valve to the sink.

16. The water supply cut-off system as set forth in claim 14, wherein the water line is located in the first room of the house upstream from the electric solenoid valve, wherein the water line extends from the electric solenoid valve downstream to a location located outside of the first room of the house, wherein a by-pass of the water line around the electric solenoid valve is not present.

17. The water supply shut-off system as set forth in claim 14, wherein the water line, the main shut-off valve, the electric solenoid valve, and the switch do not have a remote control.

18. The water supply shut-off system as set forth in claim 14, further comprising:
a first connector that is attached to the electric solenoid valve, wherein the first connector is not made of sweating copper;
a second connector that is attached to the electric solenoid valve, wherein the second connector is not made of sweating copper; and
a coupling that is attached to the first connector and to the water line.

19. The water supply shut-off system as set forth in claim 14, wherein all signal communication in the system is through wired connections.

20. A water supply cut-off system, comprising:
a water line;
a main shut-off valve movable between a main shut-off valve open position that allows water to flow through the water line, and a main shut-off valve closed position that prevents water flow through the water line;
an electric solenoid valve located downstream from the main shut-off valve, wherein the electric solenoid valve has an open position that allows water to flow through the electric solenoid valve, and a closed position that prevents water flow through the electric solenoid valve;
a switch that is in electrical communication with the electric solenoid valve through a wired connection, wherein the switch is actuated by a user to cause the electric solenoid valve to move from the open position to the closed position, and wherein the switch is actuated by the user to cause the electric solenoid valve to move from the closed position to the open position, wherein the switch is not in communication with the main shut-off valve such that the switch does not move the main shut-off valve between the main shut-off valve open position and the main shut-off valve closed position, wherein the switch is manually actuated by a user, and wherein wireless signals are not present to effect the opening or closing of the electric solenoid valve;
wherein the electric solenoid valve is located in a first room of a house, and wherein the switch is located in a second room of the house;
a wall outlet for obtaining electricity, wherein the wall outlet has female receivers;
a ground fault interrupter that is plugged into the wall outlet, wherein the ground fault interrupter is removably attached to the wall outlet such that the ground fault interrupter is capable of being unplugged from the wall outlet, wherein the ground fault interrupter has male prongs that are received by the female receivers of the wall outlet when the ground fault interrupter is plugged into the wall outlet; and
a wire connected to the switch, wherein electricity from the wall outlet flows through the ground fault interrupter and the wire to the switch in order to power the switch.

21. A water supply shut-off system, comprising:
an electric solenoid valve movable between an open position that allows water to flow through the electric solenoid valve and a closed position to prevent water from flowing through the electric solenoid valve, wherein the electric solenoid valve has a manual override for opening and closing the valve in the event of power failure, and wherein the electric solenoid valve has a visual indicator that indicates the position of the valve in relation to the open or closed position of the electric solenoid valve;
a switch in electrical communication with the electric solenoid valve, wherein the switch is illuminated, wherein the switch is water resistant for use in damp conditions;
a wire in electrical communication with the switch, wherein the wire has a connector that is illuminated;
a ground fault interrupter that is attached to a wall outlet and is in electrical communication with the wall outlet and the male connector of the wire;
a first connector that is attached to the electric solenoid valve, wherein the first connector is not made of sweating copper;
a second connector that is attached to the electric solenoid valve, wherein the second connector is not made of sweating copper; and
a coupling that is attached to the first connector.

* * * * *

UNITED STATES PATENT AND TRADEMARK OFFICE
CERTIFICATE OF CORRECTION

| | | |
|---|---|---|
| PATENT NO. | : 8,931,513 B1 | Page 1 of 1 |
| APPLICATION NO. | : 13/954436 | |
| DATED | : January 13, 2015 | |
| INVENTOR(S) | : Ricky H Holley et al. | |

It is certified that error appears in the above-identified patent and that said Letters Patent is hereby corrected as shown below:

In the Claims

In claim 3 at column 9, line 66, the word "bring" should read --being--.

Signed and Sealed this
Thirtieth Day of June, 2015

Michelle K. Lee
*Director of the United States Patent and Trademark Office*